S. MIDDLETON.
Feeding-Devices for Grinding-Mills.
No. 143,989. Patented Oct. 28, 1873.
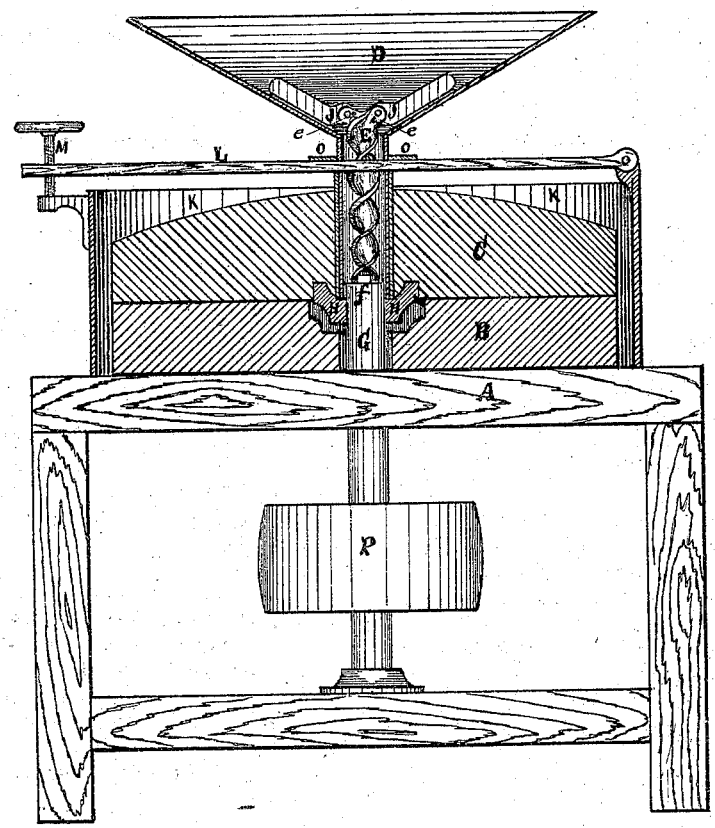

UNITED STATES PATENT OFFICE.

SIDNEY MIDDLETON, OF DUNKIRK, INDIANA, ASSIGNOR TO HIMSELF AND JACOB TROOP, OF SAME PLACE.

IMPROVEMENT IN FEEDING DEVICES FOR GRINDING-MILLS.

Specification forming part of Letters Patent No. 143,989, dated October 28, 1873; application filed May 24, 1872.

*To all whom it may concern:*

Be it known that I, SIDNEY MIDDLETON, of Dunkirk, county of Jay and State of Indiana, have invented certain Improvements in Apparatus for Feeding Grain, &c., to Grinding-Mills, of which the following is a specification:

My invention consists in the combination, with a central screw feeding device for feeding grain, &c., to grinding-mills, of feeder-wings, attached by hinged joints to the screw feeder, and revolving therewith. They extend laterally into the hopper, and, when revolved, scrape the grain, bran, middlings, or whatever may be in the hopper to be ground, into the feed-tube, whence the screw feeder forces it down to the exit at the center of the bed-stone.

Figure 1 represents a set of burrs embodying my improvement, partially in sections.

A is the frame. B is the bed-stone. C is the revolving stone. D is the hopper. E represents a screw feeder, provided with two hinged joints, $e\ e$, and on each of the joints are the arms J J. These arms extend outward, so as to catch all of the grain or bran and force it down the chute by means of the screw, and deposit it between the stones C and B. The screw feeder is secured to the upper end of the spindle G at $f$, and revolves with the upper stone.

I claim—

The central screw feeder E, provided with hinged wing feeders J J, in combination with the spindle G and hopper D, substantially as and for the purpose set forth.

In testimony whereof I have signed my name to this specification in the presence of two subscribing witnesses.

SIDNEY MIDDLETON.

Witnesses:
S. C. FRINK,
C. R. ANDERSON.